W. SLAUGHTER.
Churn.
No. 41,328.
Patented Jan. 19, 1864.
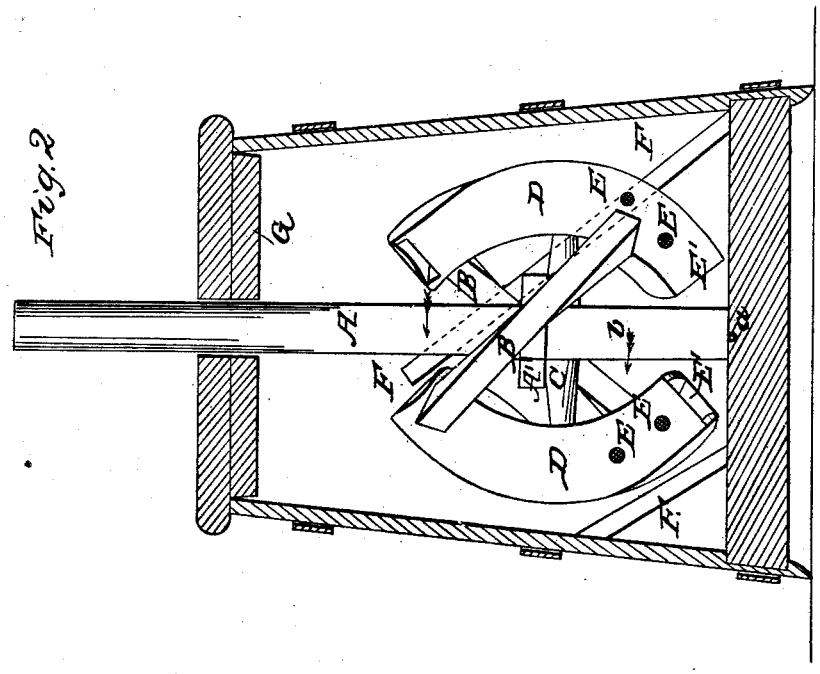
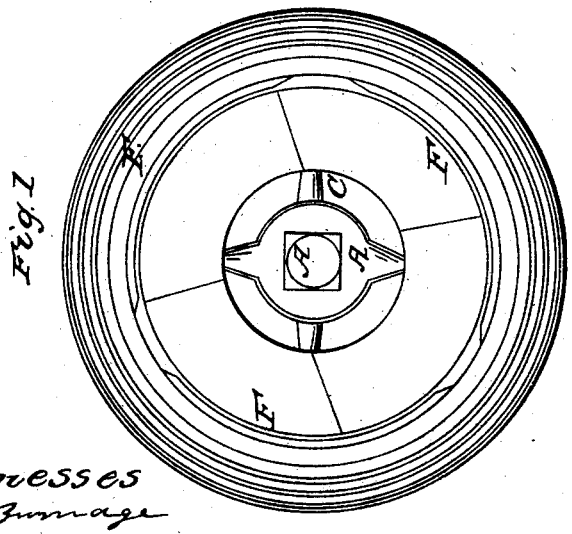
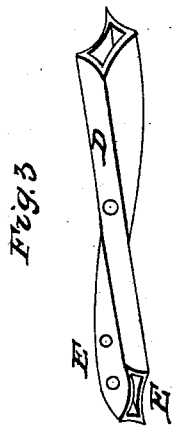
Witnesses
W. W. Furmage
J. Holmes.
Inventor
W. Slaughter

UNITED STATES PATENT OFFICE.

W. SLAUGHTER, OF WESTERVILLE, OHIO.

IMPROVEMENT IN CHURNS.

Specification forming part of Letters Patent No. 41,328, dated January 19, 1864.

*To all whom it may concern:*

Be it known that I, W. SLAUGHTER, of Westerville, in the county of Franklin and State of Ohio, have invented new and useful Improvements in Churns; and I do hereby declare that the following is a full and complete description of the construction and operation of the same, reference being had to the accompanying drawings, making part of this specification, in which—

Figure 1 is a top view of the body of the churn. Fig. 2 is a view of the body of the churn bisected, showing the interior, with the beaters or dashers in place; and Fig. 3 is a view of one of the dashers detached.

The body of the churn has its sides nearly vertical, cylindrical in form, but largest at the bottom. To the inside, from the bottom upward to about two-thirds of the height, I attach spiral ribs F, which wind from left to right downward an at angle of about forty-five (45) degrees. A shaft, A, which rotates upon a pivot, $a$, the upper end passing through and being supported by the cover G. The lower end of the shaft is square, and carries a loose arm, A', which can easily move up and down upon the shaft, and which is caused to rotate with it. Upon each end of this arm A', I secure solid spiral beaters B, which are curved in an opposite direction to the ribs F. These beaters are concave on both faces, and on the outer edge, giving thereby sharp angles to the edges, causing them to act more effectually upon the cream.

Below the arm A' is an arm, C, which passes through the shaft A, and is therefore a fixture in the shaft. Upon each end of this arm I attach spiral beaters D, having the external form of the beaters B, and winding in the same direction.

The beaters D are hollow throughout their whole length and open at both ends. The lower section of each is provided with holes E upon both faces for the egress of air into the cream as the beaters are caused to rotate in the direction of the arrow $b$. The lower end of the beaters being also open, the action of the cream causes a current of air to enter the top and issue into the cream, both through the holes E and lower ends E'. This introduction of air into the cream in connection with the combined action of the beaters and ribs causes the rapid separation of the butter. When this event takes place, the beaters B, with the arm A', are removed or lifted above the butter, and by a reverse action of the beaters D upon the butter, in connection with the action of the ribs F, the butter is quickly gathered by being brought forcibly in contact with the ribs F. The shaft A can be rotated by any convenient method.

What I claim as new, and of my own invention, and for which I desire Letters Patent, is—

The concave spiral beaters B and D upon a revolving shaft, in combination with the spiral ribs F, arranged and operated as and for the purpose set forth.

W. SLAUGHTER.

Witnesses :
   W. H. BURRIDGE,
   J. HOLMES.